(12) United States Patent
Yang

(10) Patent No.: US 11,866,856 B2
(45) Date of Patent: Jan. 9, 2024

(54) NEEDLE-PASS PAPER CORD, CORE-SPUN NEEDLE-PASS PAPER CORD, AND MANUFACTURING METHOD THEREFOR

(71) Applicant: Huizhou Asun Paper Products Co., Ltd., Huizhou (CN)

(72) Inventor: Wei Yang, Huizhou (CN)

(73) Assignee: Huizhou Asun Paper Products Co., Ltd., Huizhou (CN)

( * ) Notice: Subject to any disclaimer, the term of this patent is extended or adjusted under 35 U.S.C. 154(b) by 241 days.

(21) Appl. No.: 17/427,964

(22) PCT Filed: Sep. 18, 2020

(86) PCT No.: PCT/CN2020/116244
§ 371 (c)(1),
(2) Date: Aug. 3, 2021

(87) PCT Pub. No.: WO2021/063196
PCT Pub. Date: Apr. 8, 2021

(65) Prior Publication Data
US 2022/0010488 A1    Jan. 13, 2022

(30) Foreign Application Priority Data
Sep. 30, 2019   (CN) .......................... 201910922099.3

(51) Int. Cl.
*D02G 3/08*     (2006.01)
*D04B 1/22*     (2006.01)
*D07B 5/00*     (2006.01)
*D02G 3/36*     (2006.01)
*D04B 1/14*     (2006.01)
*D07B 1/02*     (2006.01)

(52) U.S. Cl.
CPC ............... *D02G 3/08* (2013.01); *D02G 3/36* (2013.01); *D04B 1/22* (2013.01); *D07B 5/00* (2013.01); *D04B 1/14* (2013.01); *D07B 1/02* (2013.01); *D07B 2201/102* (2013.01); *D07B 2201/1096* (2013.01); *D07B 2201/2041* (2013.01); *D07B 2205/103* (2013.01)

(58) Field of Classification Search
CPC ... D02G 3/06; D02G 3/08; D02G 3/36; D04B 1/22; D07B 5/00
USPC .......................................................... 57/260
See application file for complete search history.

(56) References Cited

U.S. PATENT DOCUMENTS

| | | | | | |
|---|---|---|---|---|---|
| 437,386 | A | * | 9/1890 | Williams | D07B 1/02 57/260 |
| 523,060 | A | * | 7/1894 | Williams | D07B 1/02 57/260 |
| 1,972,607 | A | * | 9/1934 | Strawn | D07B 5/00 57/259 |

(Continued)

FOREIGN PATENT DOCUMENTS

| | | |
|---|---|---|
| CN | 101831759 A | 9/2010 |
| CN | 106283380 A | 1/2017 |

(Continued)

*Primary Examiner* — Shaun R Hurley
(74) *Attorney, Agent, or Firm* — Laine IP Oy

(57) ABSTRACT

Disclosed is a needle-pass paper cord (200) made of paper. The paper cord is formed by means of weaving yarn (201) made of paper, and the yarn has a cross-section that is similar to a circle formed of a thread folded to a point.

11 Claims, 5 Drawing Sheets

(56) References Cited

U.S. PATENT DOCUMENTS

| | | | | |
|---|---|---|---|---|
| 2,097,299 | A | * | 10/1937 | Millett .................... D02G 3/08 57/260 |
| 2,137,692 | A | * | 11/1938 | Linke .................. D04B 21/202 66/193 |
| 2,284,321 | A | * | 5/1942 | Kimball ................... D02G 3/08 57/32 |
| 2,407,926 | A | | 9/1946 | Hamilton |
| 2,532,923 | A | * | 12/1950 | Kitchen .................. D02G 3/08 57/32 |
| 3,164,069 | A | | 1/1965 | Wilkie et al. |
| 3,327,468 | A | * | 6/1967 | Page ........................ D02G 3/06 139/420 R |
| 4,176,530 | A | * | 12/1979 | Cheynet ................. D03D 41/00 66/193 |
| 4,912,781 | A | * | 4/1990 | Robins ............. A41D 19/01511 57/200 |
| 6,284,094 | B1 | * | 9/2001 | Carpenter ................ D21B 1/32 206/83.5 |
| 10,309,061 | B2 | * | 6/2019 | Chtourou ............. B31D 1/0056 |
| 2004/0151905 | A1 | * | 8/2004 | Tsukamoto .............. D02G 3/06 428/373 |
| 2005/0016564 | A1 | * | 1/2005 | Sekiya ..................... D04C 1/02 132/323 |
| 2014/0370772 | A1 | * | 12/2014 | Ban ...................... D02G 1/0293 442/139 |
| 2016/0355981 | A1 | * | 12/2016 | Chtourou .............. D21H 25/005 |
| 2018/0251917 | A1 | * | 9/2018 | Ezer ....................... D03D 15/47 |
| 2019/0169770 | A1 | * | 6/2019 | Tsukamoto ............. D02G 3/06 |

FOREIGN PATENT DOCUMENTS

| | | |
|---|---|---|
| CN | 110004577 A | 7/2019 |
| CN | 110528163 A | 12/2019 |
| CN | 211112483 U | 7/2020 |
| JP | 2009007888 A | 1/2009 |
| JP | 2016023384 A | 2/2016 |

* cited by examiner

Having helical cross section

NEEDLE-PASS PAPER CORD, CORE-SPUN NEEDLE-PASS PAPER CORD, AND MANUFACTURING METHOD THEREFOR

CROSS-REFERENCE TO RELATED APPLICATION

The present disclosure claims priority of Chinese patent application with the filing number 201910922099.3 filed on Sep. 30, 2019 with the Chinese Patent Office, and entitled "Needle-pass Paper Cord", the contents of which are incorporated herein by reference in entirety.

TECHNICAL FIELD

The present disclosure relates to a knitted fabric, in particular, to a needle-pass (knitted) paper cord.

BACKGROUND ART

With the enhancement of human awareness of environmental protection, the needle-pass paper cord made of paper and other recyclable and degradable materials has been widely used in recent years. The existing paper needle-pass cord is usually made by twisting the paper strips into paper yarn, and then knitting the paper yarn into needle-pass paper cord.

The applicant found that there are at least the following problems in the prior art: because the twisted paper yarn is used for knitting, and the twisted paper yarn has greater stress and compact texture, the needle-pass paper cord knitted has a hard texture and uneven shape.

SUMMARY

The present disclosure provides a paper needle-pass paper cord, which has at least one of the technical effects of soft texture and uniform shape.

The present disclosure provides a paper needle-pass paper cord, which is knitted using yarn made of paper, and the yarn has a cross-section that is similar to a circle formed by a line being folded about a point.

According to the above solution, the needle-pass paper cord provided in the present disclosure can at least obtain the following beneficial effects.

1. The yarn is pultruded to form a cross-section that is similar to a line folded to a point into a circle, the yarn has the force to leave its axis under the action of its fiber elasticity, and therefore, the needle-pass paper cord knitted has a better expansion effect and is softer to the touch.

2. The yarn is only folded toward its axis, and the needle-pass paper cord knitted has less stress in various parts, and the deformation after knitted is smaller, so the needle-pass paper cord has a more uniform shape.

3. The yarn is only folded towards its axis, the yarn fiber is not inclined or slightly inclined, and the length of the yarn is not shortened or slightly shortened, so knitting the needle-pass paper cord in this way saves material.

4. The yarn is pultruded to form a cross-section that is similar to a line folded to a point into a circle, the yarn has the force to leave its axis under the action of its fiber elasticity, therefore, the needle-pass paper cord knitted has larger and more pores between the various parts, and the contact surface with the outside is larger, which is beneficial to the later recycling or degradation treatment.

Optionally, the yarn has a line with two ends away from each other in a circumferential part, and the remaining part is folded about a point as a center to form a circular-like cross-section.

Optionally, the yarn has a cross-section similar to a circle formed by a continuous line radiating outward about a point as the center.

Optionally, a part of the yarn away from its axis is arched.

Optionally, the yarn has a cross-section similar to a circular comb.

Optionally, the needle-pass paper cord includes a plurality of yarn loops; and the needle-pass paper cord is formed by successively stringing a plurality of yarn loops into a circle and continuously performing the stringing along one direction.

Optionally, the yarn loop is composed of a single yarn.

Optionally, stringing directions of any two adjacent yarn loops along a circumferential direction of the needle-pass paper cord are opposite to each other.

Optionally, the needle-pass paper cord has lines that are approximately parallel to each other along a stringing track.

Optionally, the yarn includes a plurality of branch lines; and the plurality of branch lines have a gap, and the plurality of branch lines are connected with each other by winding.

Optionally, the yarn also includes a connection end; and the plurality of branch lines are connected end to end in turn, and the plurality of branch lines are connected with each other by winding at one end away from the connection end.

Optionally, the yarn also includes a connection end; and the plurality of branch lines are connected end to end in turn, and the plurality of branch lines are arranged to extend to the outside with the connection end as the center.

The present disclosure provides a core-spun needle-pass paper cord, which includes a cord core, and the needle-pass paper cord is sheathed outside the cord core with the cord core as the center.

The beneficial effects of core-spun needle-pass paper cord provided by the present disclosure includes that the core-spun needle-pass paper cord containing the cord core enables the cord to have better tensile performance.

Optionally, the cross-sectional shape of the cord core is circular.

The present disclosure provides a method for manufacturing core-spun needle-pass paper cord, which includes the following steps:

knitting, about a cylindrical cord core as a center, yarn made of paper along an outer side wall of the cord core; and folding the yarn to its axis to form a needle-pass paper cord wound on the outside of the cord core.

BRIEF DESCRIPTION OF DRAWINGS

In order to more clearly illustrate the specific embodiments of the present disclosure or technical solutions in the prior art, accompanying drawings which need to be used for description of the specific embodiments or the prior art will be introduced briefly below, and apparently, the accompanying drawings in the following description merely show some embodiments of the present disclosure, and those ordinarily skilled in the art still could obtain other drawings in light of these accompanying drawings, without using any inventive efforts.

Reference signs: 100—core-spun needle-pass paper cord; 200—needle-pass paper cord; 201—yarn; 211—branch line; 221—connection end; 300—cord core.

DETAILED DESCRIPTION OF EMBODIMENTS

The technical solutions of the present disclosure will be clearly and completely described below in combination with the accompanying drawings, and obviously, the embodiments described are part of the embodiments of the present disclosure, rather than all embodiments. Based on the embodiments of the present disclosure, all other embodiments obtained by those ordinarily skilled in the art, without making inventive effort, fall within the protection scope of the present disclosure.

In the description of the present disclosure, it should be noted that, terms "first", "second" are merely for descriptive purpose, but should not be construed as indicating or implying relative importance.

In the description of the present disclosure, it should be noted that, unless otherwise definitely specified and limited, the terms "mount", "link" and "connect" should be understood in a broad sense. For example, they can be fixed connection, detachable connection or integrated connection; they can be mechanical connection or electrical connection; they can be directly attached or indirectly attached by intermediate medium. Connection can be the internal communication between two components. For those ordinarily skilled in the art, the specific meaning of the above terms in the present disclosure can be understood according to the specific situation.

A needle-pass paper cord 200 of embodiments in the present disclosure is described below with reference to accompanying drawings.

Figure 1:
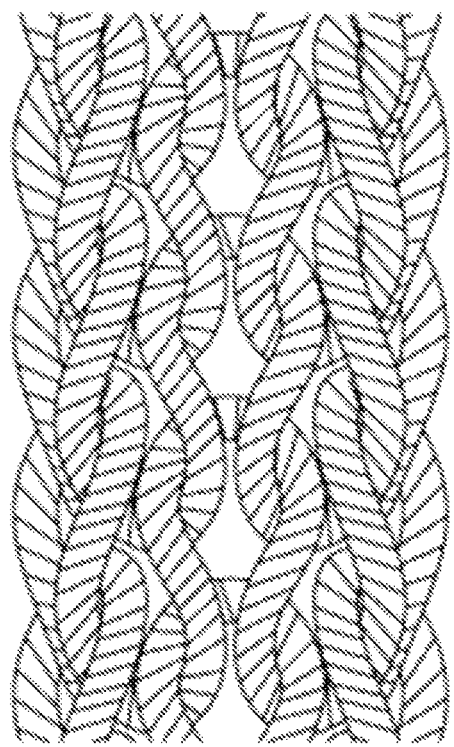
FIG. 1 is a side schematic view of a needle-pass paper cord in the prior art.
Figure 2:
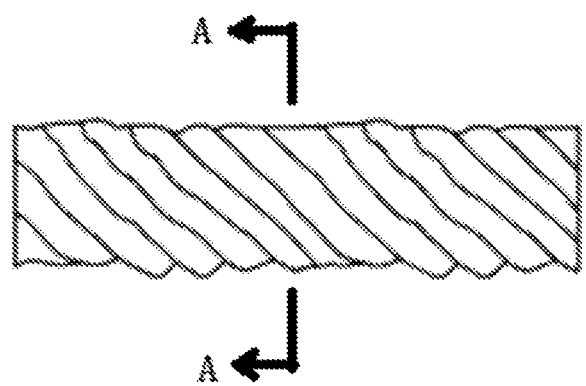
FIG. 2 is a side view of a yarn of the needle-pass paper cord in the prior art.
Figure 3:
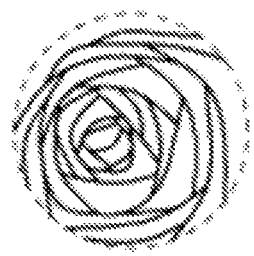
FIG. 3 is a cross-sectional view of the yarn of the needle-pass paper cord in the prior art in A-A direction.
Figure 4:
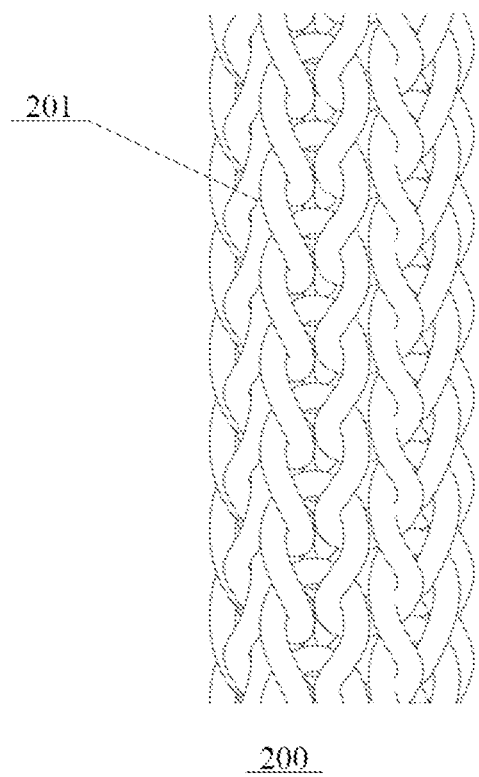
FIG. 4 is a stereogram of a needle-pass paper cord provided in the present embodiment.

FIG. 4 is an overall schematic view of the needle-pass paper cord 200. The needle-pass paper cord 200 is made by forming yarn loops with a single yarn 201, and stringing the yarn loops into circles and continuously extending by stringing in one direction.

Figure 5:
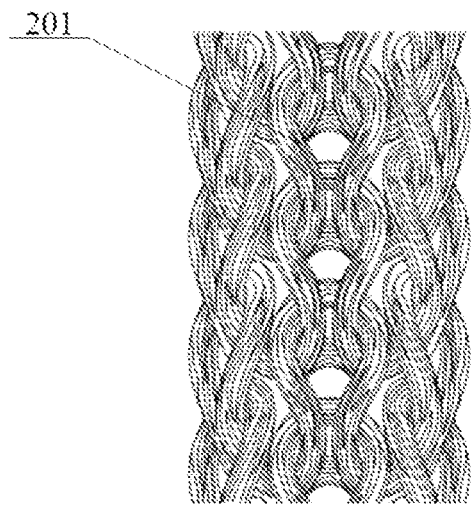
FIG. 5 is a side schematic view of the needle-pass paper cord provided in the present embodiment.

FIG. 5 is a partial enlarged view of the needle-pass paper cord 200, wherein the needle-pass paper cord 200 has lines that are approximately parallel to each other along a stringing track.

Figure 6:
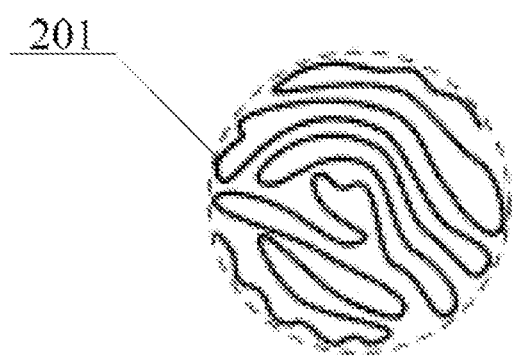
FIG. 6 is a cross-sectional view of a yarn of the needle-pass paper cord provided in the embodiment of FIG. 5.

The yarn 201 used for knitting the needle-pass paper cord 200 has a cross-section as shown in FIG. 6, wherein the cross-section appears as a line with two ends far away from each other in a circumferential part, and the other parts are folded with a point as the center to form a circular-like cross-section.

Optionally, the needle-pass paper cord 200 includes a plurality of yarn loops; and the needle-pass paper cord 200 is formed by successively stringing a plurality of yarn loops into circles and continuously extending by stringing in one direction.

Optionally, the yarn loop is composed of a single yarn 201. Optionally, the yarn 201 includes a plurality of branch lines 211; and the plurality of branch lines 211 have gaps, and the plurality of branch lines 211 are connected in a winding way to each other.

Optionally, stringing directions of any two adjacent yarn loops along the circumferential direction of the needle-pass paper cord 200 are opposite.

Adopting the needle-pass paper cord 200 of the above embodiment has at least the following beneficial effects.

The yarn 201 has a line with two ends away from each other in the circumferential part, and the other parts are folded with a point as the center to form a circular-like cross-section, the yarn 201 has the force to leave its axis under the action of its fiber elasticity, therefore, the needle-pass paper cord 200 knitted has a better expansion effect and is softer to the touch.

The yarn 201 has a line with two ends away from each other in the circumferential part, and the other parts are folded with a point as the center to form a circular-like cross-section, the yarn 201 has the force to leave its axis under the action of its fiber elasticity, therefore, the needle-pass paper cord 200 knitted has a better expansion effect. The diameter of the yarn 201 is larger than that of the yarn 201 in the prior art, and fewer turns are required to knit a needle-pass paper cord with the same diameter, which therefore saves more material.

The yarn 201 is only folded toward its axis, and the needle-pass paper cord 200 knitted has less stress in various parts, and deformation after knitted is smaller, so the needle-pass paper cord 200 has a more uniform shape.

The yarn 201 is only folded towards its axis, the yarn 201 fiber is not inclined or slightly inclined, and the length of the yarn 201 is not shortened or slightly shortened, so knitting the needle-pass paper cord 200 in this way saves material.

The yarn 201 is pultruded to form a cross-section that is similar to a line folded to a point into a circle, the yarn 201 has the force to leave its axis under the action of its fiber elasticity, therefore, the needle-pass paper cord 200 knitted has larger and more pores between the various parts, and the contact surface with the outside is larger, then in the later period of recycling or degradation treatment, the contact area with chemicals or microorganisms is larger, which is beneficial to the later recycling or degradation treatment.

A needle-pass paper cord 200 with a shape different from that of the needle-pass paper cord 200 of the above embodiment will be described below with reference to the drawings.

The knitting mode of the needle-pass paper cord 200 and the side texture of the needle-pass paper cord 200 are the same as those of the above embodiment, which will not be repeated here.

Figure 7:
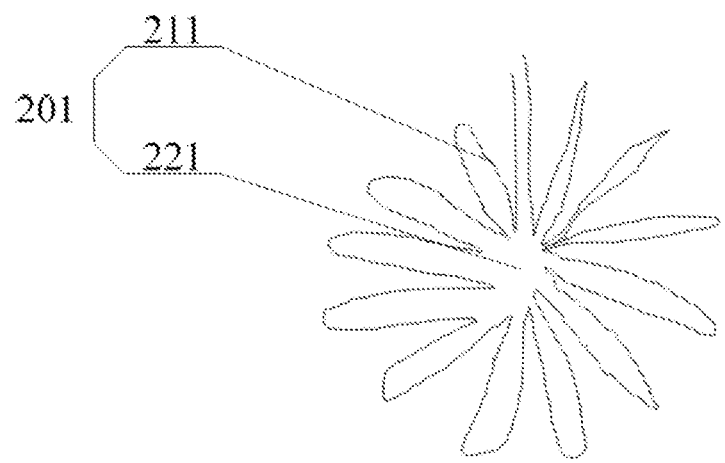
FIG. 7 is a cross-sectional view of another implementation of the yarn of the needle-pass paper cord provided in the present embodiment.

As shown in FIG. 7, the yarn 201 of the needle-pass paper cord 200 in the embodiment of the present disclosure has a circular cross-section similar to that formed by a continuous line radiating outward with a point as the center.

Optionally, the needle-pass paper cord 200 includes a plurality of yarn loops; the needle-pass paper cord 200 is formed by successively stringing a plurality of yarn loops into circles and continuously extending by stringing in one direction; and the stringing directions of any two adjacent yarn loops along the circumferential direction of the needle-pass paper cord 200 are opposite.

Optionally, the yarn loop is composed of a single yarn 201. Optionally, the yarn 201 includes a plurality of branch lines 211; and the plurality of branch lines 211 have gaps, and the plurality of branch lines 211 are connected in a winding way to each other.

Optionally, the yarn 201 also includes a connection end 221; the plurality of branch lines 211 are connected end to end in turn, and the plurality of branch lines 211 are arranged to extend to the outside with the connection end 221 as the center, wherein the connection end 221 serves as an end portion where the multiple branch lines 211 are connected and converged, and wherein the connection end 221 is a gap formed after the multiple branch lines 211 are folded. With the arrangement of the connection end 221 and the branch lines 211, the yarn 201 can have a circular cross-section similar to that formed by a continuous line radiating outward with a point as the center.

Adopting the needle-pass paper cord 200 of the present embodiment has at least the following beneficial effects.

The part of the yarn 201 away from its axis is arched, so it has greater centrifugal elasticity, therefore, the needle-pass paper cord 200 knitted has a better expansion effect and is softer to the touch.

The yarn 201 is only folded toward its axis, and the needle-pass paper cord 200 knitted has less stress in various parts, and deformation after knitted is smaller, so the needle-pass paper cord 200 has a more uniform shape.

The yarn 201 is only folded towards its axis, the yarn 201 fiber is not inclined, and the length of the yarn 201 is not shortened, so knitting the needle-pass paper cord 200 in this way saves material.

The yarn 201 has the force to leave its axis under the action of its fiber elasticity, therefore, the needle-pass paper cord 200 knitted has larger and more pores between the various parts, and the contact surface with the outside is larger, then in the later period of recycling or degradation treatment, the contact area with chemicals or microorganisms is larger, which is beneficial to the later recycling or degradation treatment.

A needle-pass paper cord 200 with a shape different from that of the needle-pass paper cord 200 of the above embodiment will be described below with reference to the drawings.

The knitting mode of the needle-pass paper cord 200 and the side texture of the needle-pass paper cord 200 are the same as those of the above embodiment, which will not be repeated here.

Figure 8:
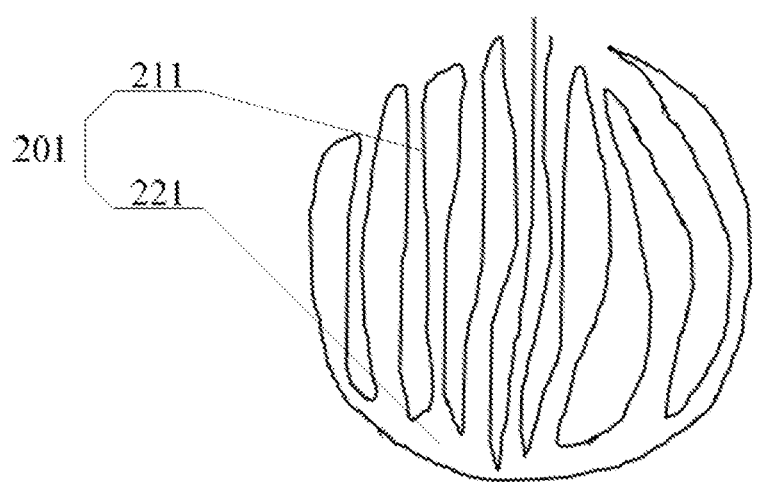
FIG. 8 is a cross-sectional view of another implementation of the yarn of the needle-pass paper cord provided in the present embodiment.

As shown in FIG. 8, the yarn 201 of the needle-pass paper cord 200 in the embodiment of the present disclosure has a cross-section similar to a circular comb.

Optionally, the yarn 201 includes a plurality of branch lines 211; and the plurality of branch lines 211 have gaps, and the plurality of branch lines 211 are connected in a winding way to each other.

Optionally, the yarn 201 also includes a connection end 221; the plurality of branch lines 211 are connected end to end in turn, and the plurality of branch lines 211 are wound and connected with each other at one end away from the connection end 221, wherein the connection end 221 serves as an end portion where the multiple branch lines 211 are connected and converged, and wherein the connection end 221 is a gap formed after the multiple branch lines 211 are folded. With the arrangement of the connection end 221 and the branch lines 211, the yarn 201 can have a cross-section similar to a circular comb.

The needle-pass paper cord 200 of the present embodiment has the same beneficial effect as the above embodiment, which will not be repeated here.

Figure 9:
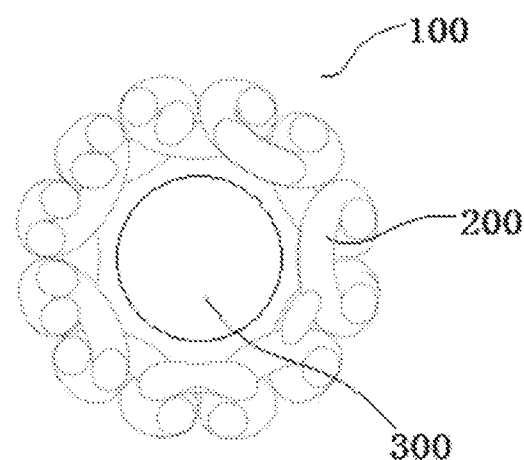
FIG. 9 is a cross-sectional view of another implementation of the yarn of the needle-pass paper cord provided in the present embodiment.

As shown in FIG. 9, the present embodiment provides a core-spun needle-pass paper cord 100, which includes the needle-pass paper cord 200 of the above embodiment and a cord core 300.

Optionally, the cross-sectional shape of the cord core 300 is circular.

Adopting the core-spun needle-pass paper cord of the present embodiment has at least the following beneficial effects.

The core-spun needle-pass paper cord containing the cord core enables the cord to have better tensile performance.

The core-spun needle-pass paper cord containing the needle-pass paper cord 200 of the above embodiment has the same beneficial effects as the above embodiment, which will not be repeated here.

In addition, in the embodiment of the present disclosure, the needle-pass paper cord 200 described in the above embodiment is adopted, but it can be implemented even in the case of the needle-pass paper cord 200 in the other two implementations of the above embodiments.

The present embodiment provides a method for manufacturing the core-spun needle-pass paper cord 200, which includes the following steps: with a cylindrical cord core as a center, knitting the yarn 201 made of paper along an outer side wall of the cord core; and folding the yarn 201 to its axis to form the needle-pass paper cord 200 wound on the outside of the cord core.

In the present embodiment, forming the core-spun needle-pass paper cord 100 by the knitting of the cord core and the needle-pass paper cord 200 enables the cord to have better tensile performance.

Finally, it should be noted that: the above embodiments are only used to illustrate the technical solution of the present disclosure, not to limit it; although the present disclosure has been described in detail with reference to the above-mentioned embodiments, those ordinarily skilled in the art should understand that they can still modify the technical solution recorded in the above-mentioned embodiments, or equivalently replace some or all of the technical features; and these modifications or substitutions do not make the essence of the corresponding technical solutions out of the scope of the technical solutions of the embodiments of the present disclosure.

INDUSTRIAL APPLICABILITY

A needle-pass paper cord is provided by the embodiments of the present disclosure. The needle-pass paper cord knitted has better expansion effect, and is softer to the touch, can save more materials, and have a more uniform shape. In the later period of recycling or degradation treatment, the contact area with chemicals or microorganisms is larger, which is beneficial to the later recycling or degradation treatment.

What is claimed is:

1. A needle-pass paper cord, wherein the needle-pass paper cord is knitted using a yarn made of paper, wherein the yarn has a cross-section that is similar to a circle formed by a line being folded about a point, wherein the yarn has a cross-section similar to a circular comb, and wherein the cross-section has a part formed by more than two branch lines arranged at intervals.

2. The needle-pass paper cord according to claim 1, wherein the needle-pass paper cord comprises a plurality of yarn loops, wherein the needle-pass paper cord is formed by successively stringing the plurality of yarn loops into a circle and continuously performing the stringing along one direction.

3. The needle-pass paper cord according to claim 2, wherein each of the yarn loops is composed of a single yarn.

4. The needle-pass paper cord according to claim 3, wherein stringing directions of any two adjacent yarn loops along a circumferential direction of the needle-pass paper cord are opposite to each other.

5. The needle-pass paper cord according to claim 2, wherein stringing directions of any two adjacent yarn loops along a circumferential direction of the needle-pass paper cord are opposite to each other.

6. The needle-pass paper cord according to claim 1, wherein the needle-pass paper cord has lines that are approximately parallel to each other along a stringing track.

7. The needle-pass paper cord according to claim 1, wherein the yarn also comprises a connection end,
    wherein the plurality of branch lines are connected end to end in turn, and the plurality of branch lines are connected with each other by winding at one end away from the connection end.

8. The needle-pass paper cord according to claim 1, wherein the yarn also comprises a connection end, wherein the plurality of branch lines are connected end to end in turn, and the plurality of branch lines are arranged to extend outward with the connection end as a center.

9. A core-spun needle-pass paper cord, wherein the core-spun needle-pass paper cord comprises a cord core, and the needle-pass paper cord according to claim 1 is sheathed outside the cord core with the cord core as a center.

10. The core-spun needle-pass paper cord according to claim 9, wherein the cord core has a circular cross-section.

11. A method for manufacturing the core-spun needle-pass paper cord according to claim 9, comprising the following steps:
    knitting, about a cylindrical cord core as a center, a yarn made of paper along an outer side wall of the cord core; and
    folding the yarn to an axis thereof to form the needle-pass paper cord wound on an outside of the cord core.

* * * * *